(12) United States Patent
Munoz et al.

(10) Patent No.: US 12,325,289 B2
(45) Date of Patent: Jun. 10, 2025

(54) KNOB CONTROL FOR SLIM VENT IN VEHICLE

(71) Applicant: GM GLOBAL TECHNOLOGY OPERATIONS LLC, Detroit, MI (US)

(72) Inventors: Angel R. Munoz, Rochester Hills, MI (US); Steven J. Leathorn, Fort Gratiot, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 466 days.

(21) Appl. No.: 17/866,853

(22) Filed: Jul. 18, 2022

(65) Prior Publication Data

US 2024/0017596 A1    Jan. 18, 2024

(51) Int. Cl.
*B60H 1/34*    (2006.01)

(52) U.S. Cl.
CPC ... *B60H 1/3421* (2013.01); *B60H 2001/3471* (2013.01)

(58) Field of Classification Search
CPC .......... B60H 1/3421; B60H 2001/3471; B60H 2001/3478; B60H 1/3414; B60H 1/00871
USPC ......................................................... 454/155
See application file for complete search history.

(56) References Cited

U.S. PATENT DOCUMENTS

| | | | | |
|---|---|---|---|---|
| 2016/0288624 | A1* | 10/2016 | Albin | B60H 1/3421 |
| 2017/0259649 | A1* | 9/2017 | Shibata | B60H 1/3421 |
| 2018/0283729 | A1* | 10/2018 | Terasawa | F24F 13/1426 |

FOREIGN PATENT DOCUMENTS

| | | | | |
|---|---|---|---|---|
| DE | 102012112222 A1 | | 7/2013 | |
| DE | 102014200544 A1 | * | 7/2014 | ......... B60H 1/3428 |
| DE | 102015101116 A1 | * | 8/2015 | ......... B60H 1/3421 |
| DE | 102020204799 A1 | * | 10/2021 | ......... B60H 1/3421 |

OTHER PUBLICATIONS

English translation of DE-102014200544-A1, dated Dec. 19, 2024 (Year: 2024).*
English translation of DE-102015101116-A1, dated Dec. 19, 2024 (Year: 2024).*
English translation of DE-102020204799-A1, dated Dec. 19, 2024 (Year: 2024).*
German Office Action for German Application No. 102023100369.0; dated Apr. 21, 2023; 6 pages.

* cited by examiner

*Primary Examiner* — Edelmira Bosques
*Assistant Examiner* — Brett Peterson Mallon
(74) *Attorney, Agent, or Firm* — CANTOR COLBURN LLP (57) ABSTRACT

A vent assembly of a vehicle includes a bezel defining a vent opening through which an airflow is directed. A primary vane extends across the vent opening. The primary vane is selectably movable about a primary vane axis to adjust a direction of the airflow. A plurality of secondary vanes are arrayed across the vent opening. Each primary vane is selectably movable about a secondary vane axis nonparallel to the primary vane axis to adjust the direction of the airflow. An adjustment knob has a knob central axis. The adjustment knob is configured such that movement of the adjustment knob along the knob central axis moves the primary vane about the primary vane axis, and rotating the adjustment knob about the knob central axis moves the plurality of secondary vanes about their respective secondary vane axes.

17 Claims, 7 Drawing Sheets

KNOB CONTROL FOR SLIM VENT IN VEHICLE

INTRODUCTION

The subject disclosure relates to heating, ventilation and air conditioning of a vehicle. In particular, the present disclosure relates to directional control of airflow out of vents in the vehicle. Vehicles have multiple air vents in, for example, an instrument panel of the vehicle to distribute conditioned airflow into the passenger compartment of the vehicle. These vents typically use slide levers to move one or more sets of louvers or doors inside the vent to change the side-to-side and/or up-down direction of the airflow. With styling changes to vehicle interiors, the use of slim profile vents is increasing in usage. The configuration of the slim profile vent makes the typical adjustment mechanism difficult to utilize. As such, it is desirable to provide an alternative to the typical adjustment mechanism, which is more compatible with the slim profile vent configuration.

SUMMARY

In one embodiment, a vent assembly of a vehicle includes a bezel defining a vent opening through which an airflow is directed. A primary vane extends across the vent opening. The primary vane is selectably movable about a primary vane axis to adjust a direction of the airflow. A plurality of secondary vanes are arrayed across the vent opening. Each primary vane is selectably movable about a secondary vane axis nonparallel to the primary vane axis to adjust the direction of the airflow. An adjustment knob has a knob central axis. The adjustment knob is configured such that movement of the adjustment knob along the knob central axis moves the primary vane about the primary vane axis, and rotating the adjustment knob about the knob central axis moves the plurality of secondary vanes about their respective secondary vane axes.

Additionally or alternatively, in this or other embodiments an adjustment shaft extends from the adjustment knob along the knob central axis. Two parallel disks are located along the adjustment shaft spaced apart by a disk gap. A vane pin extends from the primary vane and disposed in the disk gap.

Additionally or alternatively, in this or other embodiments the vane pin is offset from the primary vane axis.

Additionally or alternatively, in this or other embodiments a first bevel gear is installed onto the adjustment shaft. The first bevel gear is operably connected to the plurality of secondary vanes to move the plurality of secondary vanes about their respective secondary vane axes via rotation of the first bevel gear about the knob axis.

Additionally or alternatively, in this or other embodiments the first bevel gear is slidably installed onto the adjustment shaft, such when the adjustment knob is moved along the knob axis the first bevel gear maintains operable connection with the plurality of secondary vanes.

Additionally or alternatively, in this or other embodiments one or more shaft engagement features of the adjustment shaft are engaged with one or more complimentary gear engagement features of the first bevel gear.

Additionally or alternatively, in this or other embodiments a gear cap is located at an end of the first bevel gear. The gear cap includes a plurality of openings to control a force required to move the adjustment knob along the knob axis.

Additionally or alternatively, in this or other embodiments the first bevel gear is operably connected to the plurality of secondary vanes via a second bevel gear meshed with the first bevel gear.

Additionally or alternatively, in this or other embodiments the primary vane axis is perpendicular to the secondary vane axis.

Additionally or alternatively, in this or other embodiments the adjustment shaft extends through the bezel.

In another embodiment, a method of adjusting airflow through a vent assembly of a vehicle includes providing an adjustment knob operably connected to a primary vane of the vent assembly and to a plurality of secondar vanes of the vent assembly, moving the adjustment knob along a central knob axis to rotate the primary vane about a primary vane axis to adjust a position of the primary vane, and rotating the adjustment knob about the central knob axis to rotate the plurality of secondary vanes about their respective secondary vane axes to adjust a position of the plurality of secondary vanes. A direction of the airflow is adjusted as a result of adjusting the position of the primary vane and the plurality of secondary vanes.

Additionally or alternatively, in this or other embodiments the primary vane is rotated about the primary vane axis by moving a vane pin extending from the primary vane. The vane pin is operably connected to the adjustment knob via an adjustment shaft extending from the adjustment knob along the knob central axis. The vane pin is located between two parallel disks located along the adjustment shaft.

Additionally or alternatively, in this or other embodiments the vane pin is offset from the primary vane axis.

Additionally or alternatively, in this or other embodiments the plurality of secondary vanes are moved about their respective secondary vane axes via rotation of a first bevel gear about the knob axis. The first bevel gear is installed onto the adjustment shaft, and the first bevel gear is operably connected to the plurality of secondary vanes.

Additionally or alternatively, in this or other embodiments the first bevel gear is slidably installed onto the adjustment shaft, such when the adjustment knob is moved along the knob axis the first bevel gear maintains operable connection with the plurality of secondary vanes.

Additionally or alternatively, in this or other embodiments a force required to move the adjustment knob along the knob axis is controlled via a plurality of openings in a gear cap located at an end of the first bevel gear.

Additionally or alternatively, in this or other embodiments the first bevel gear is operably connected to the plurality of secondary vanes via a second bevel gear meshed with the first bevel gear.

Additionally or alternatively, in this or other embodiments the primary vane axis is perpendicular to the secondary vane axis.

Additionally or alternatively, in this or other embodiments the adjustment shaft extends through a bezel of the vent assembly.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Figure 1:
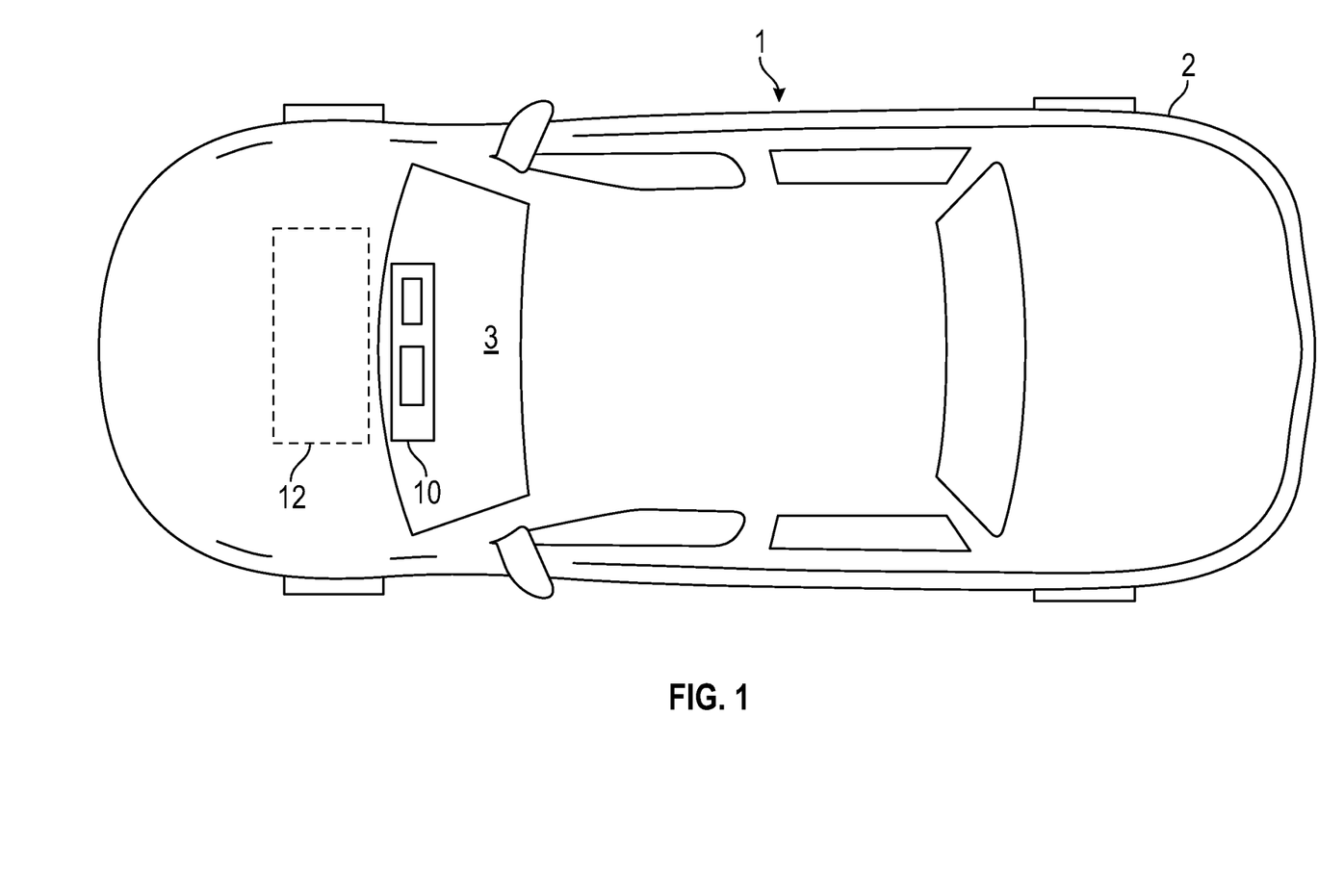
FIG. 1 is an illustration of an embodiment of a vehicle.
Figure 2:
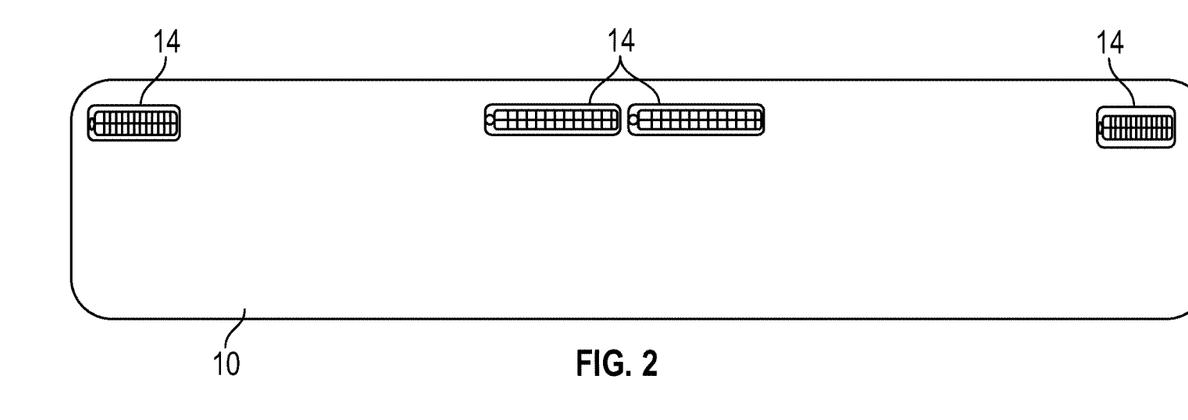
FIG. 2 is a schematic illustration of an embodiment of an instrument panel of a vehicle.

In accordance with an exemplary embodiment, illustrated in FIG. 1 is an embodiment of a vehicle 1. The vehicle 1 includes a vehicle body 2, which defines an occupant compartment 3 in an interior of the vehicle 1. As shown in FIG. 2, the occupant compartment 3 includes an instrument panel 10 extending across the occupant compartment 3. The occupant compartment 3 is conditioned to be heated or cooled via a heating, ventilation and air conditioning (HVAC) system 12 (shown in FIG. 1), with conditioned airflow into the occupant compartment 3 via one or more vent assemblies 14 located in the instrument panel 10. While the vent assemblies 14 are described herein as being located in the instrument panel 10, one skilled in the art will readily appreciate that the vent assemblies 14 may be additionally or alternatively located at other locations such as, for example, doors of the vehicle or a center console of the vehicle.

Figure 3:
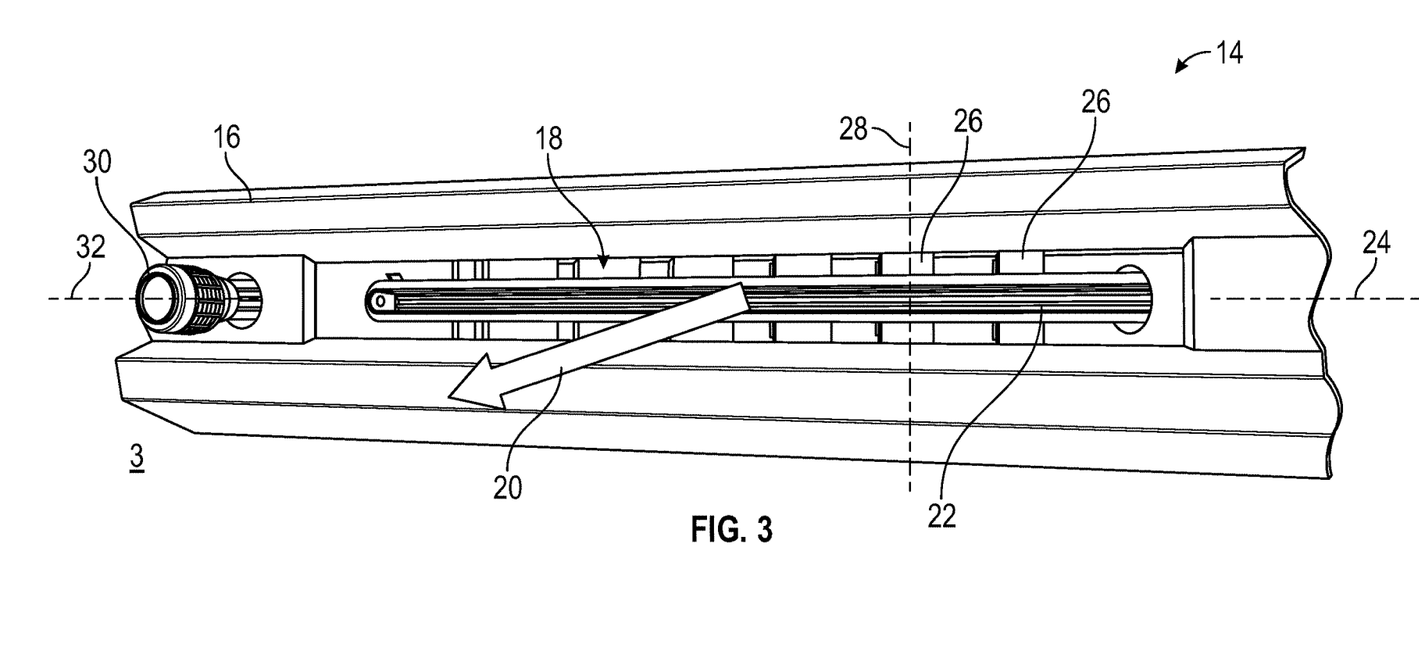
FIG. 3 is a perspective view of an embodiment of a vent assembly of a vehicle.

An embodiment of a vent assembly 14 is illustrated in FIG. 3. The vent assembly 14 includes a bezel 16, which defines a vent opening 18 through which the airflow 20 is directed into the occupant compartment 3. The vent assembly 14 includes a movable primary vane 22 which is rotatable about a primary vane axis 24, and a plurality of secondary vanes 26, which are each rotatable about respective secondary vane axes 28. In some embodiments, the primary vane axis 24 is a horizontal axis, such that rotation of the primary vane 22 about the primary vane axis 24 changes a direction of the airflow 20 in a first, vertical direction with respect to the passenger compartment 3. Further, in some embodiments the secondary vane axis 28 is a vertical axis, such that rotation of the secondary vanes 26 about their secondary vane axes 28 changes the direction of the airflow 20 in a second, horizontal direction. The primary vane 22 and secondary vanes 26 are moved to direct the airflow 20 in a selected or desired direction. The apparatus utilized to move the primary vane 22 and the secondary vanes 26 will be described in detail below.

The vent assembly 14 includes an adjustment knob 30 that extends through the bezel 16 and which is a user's mechanism for adjusting the position of the primary vane 22 and the secondary vanes 26. The adjustment knob 30 is operably connected to the primary vane 22 and the secondary vanes 26 such that a push or pull movement of the adjustment knob 30 along a knob axis 32 adjusts the position of the primary vane 22, and a rotation of the adjustment knob 30 about the knob axis 32 adjusts the position of the secondary vanes 26.

Figure 4:
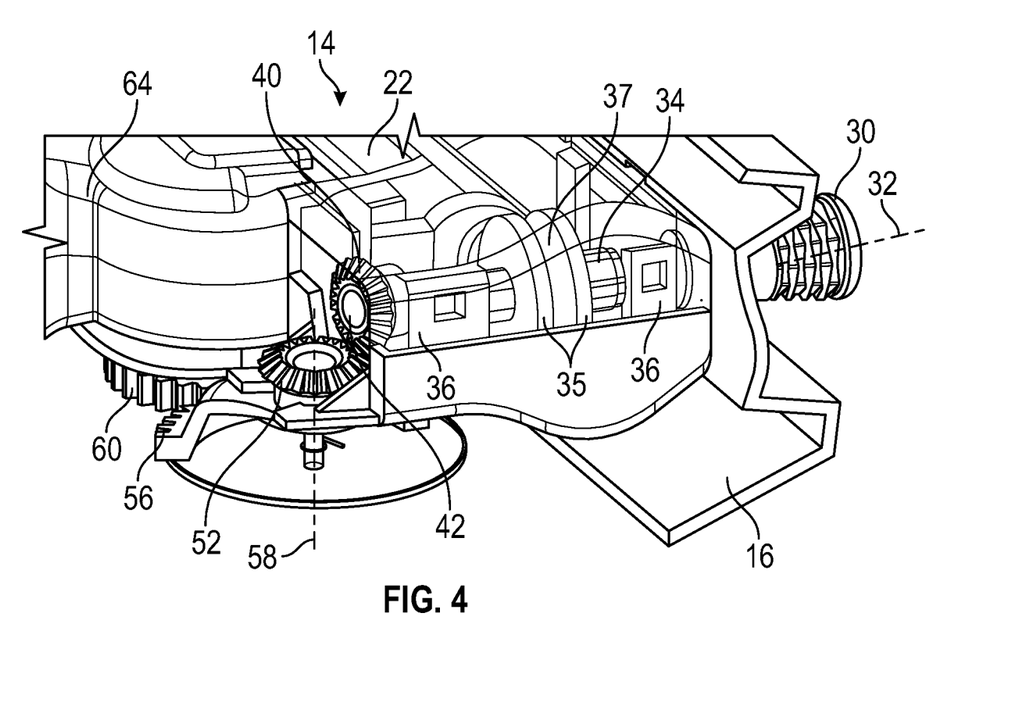
FIG. 4. is a perspective view of an adjustment mechanism of a primary vane of a vent assembly.
Figure 5:
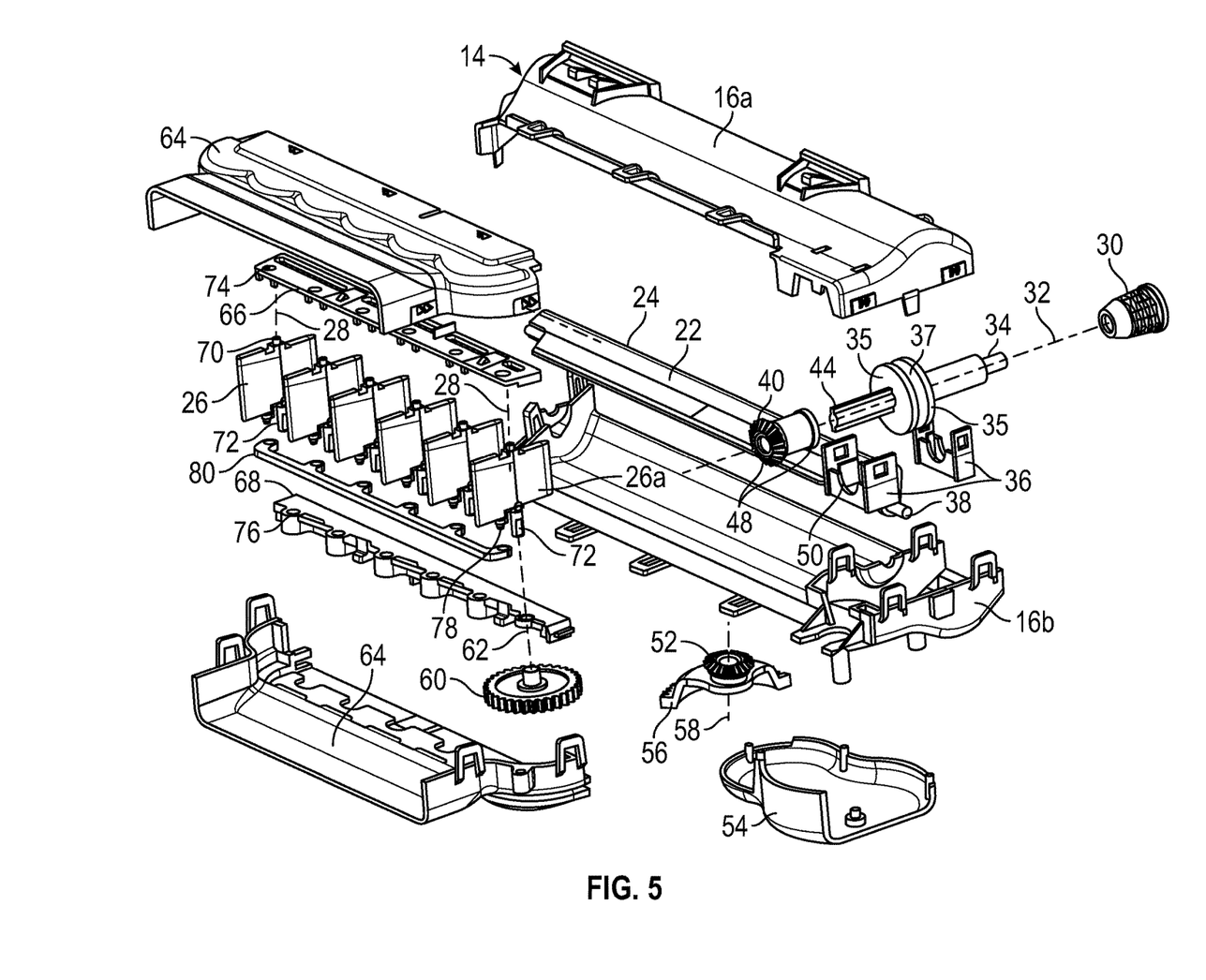
FIG. 5 is an disassembled view of a vent assembly from a rear of the vent assembly.
Figure 6A:
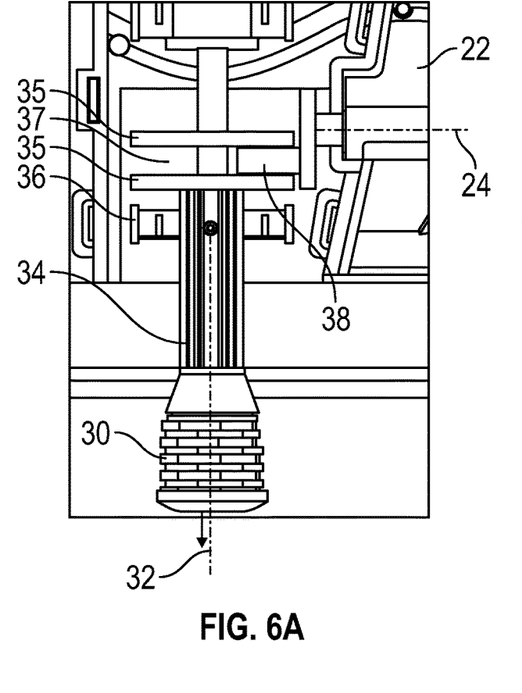
FIG. 6A is a plan view of the adjustment mechanism in a first position.
Figure 6B:
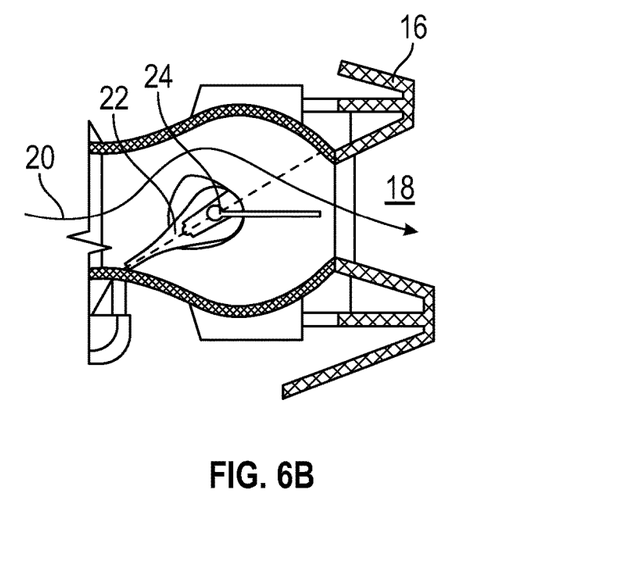
FIG. 6B is a side view of the primary vane when the adjustment mechanism is moved to the first position.
Figure 7A:
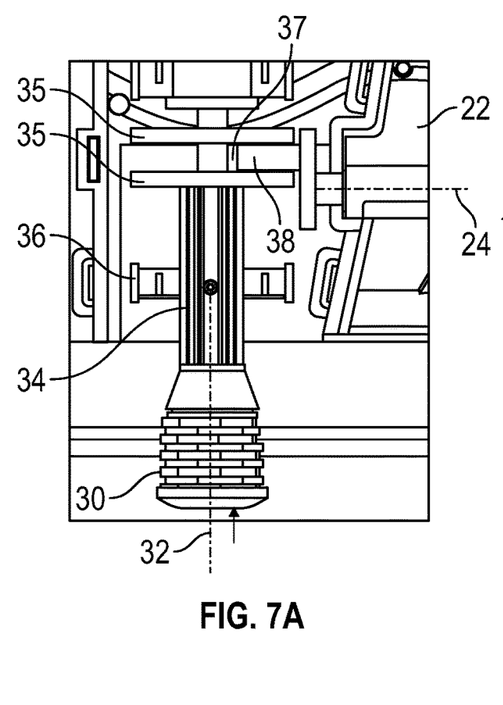
FIG. 7A is a plan view of the adjustment mechanism in a second position.
Figure 7B:
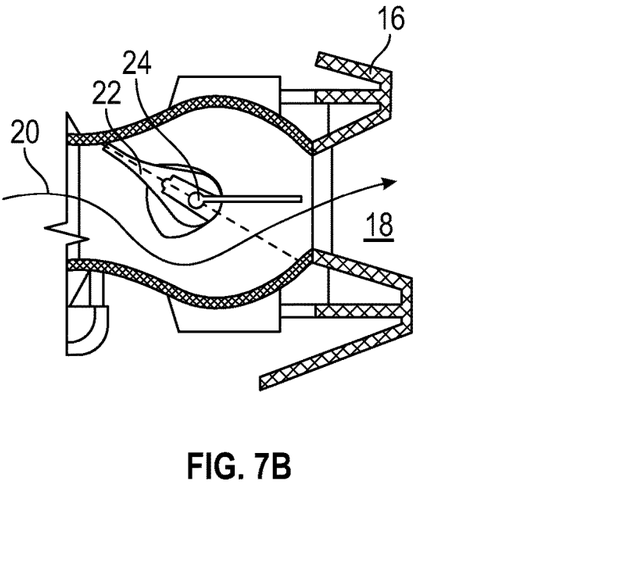
FIG. 7B is a side view of the primary vane when the adjustment mechanism is moved to the second position.

Referring now to the perspective view of FIG. 4 and to the disassembled view of FIG. 5, the bezel 16 includes an upper bezel 16a and a lower bezel 16b, that when assembled together define the vent opening 18 and secure the adjustment knob 30 and primary vane 22 in the vent assembly 14. An adjustment shaft 34 extends from the adjustment knob 30 and is supported in the bezel 16 by a shaft support 36, which allows the movement of the adjustment shaft 34 along the knob axis 32, and also rotation of the adjustment knob 30 about the knob axis 32. The adjustment shaft 34 includes parallel disks 35 located along the adjustment shaft 34, spaced apart by a disk gap 37. The primary vane 22 is operably connected to the adjustment shaft 34 via a vane pin 38 extending from the primary vane 22. The vane pin 38 is located in the disk gap 37 between the parallel disks 35. The vane pin 38 is offset from the primary vane axis 24 so that moving the adjustment knob 30 in a first direction along the knob axis 32, such as pulling in FIG. 6A, causes the parallel disks 35 urge rotation of the primary vane 22 about the primary vane axis 24 in a first direction as shown in FIG. 6B. Moving the adjustment knob 30 in a second direction along the knob axis 32, such as pushing in FIG. 7A, causes the parallel disks 35 to urge rotation of the primary vane 22 about the primary vane axis 24 in a second direction opposite the first direction as shown in FIG. 7B. In some embodiments, moving the adjustment knob 30 along the knob axis 32 in the range of 4-5 millimeters results in a rotation of the primary vane 22 of about 30 degrees about the primary vane axis 24.

Figure 8:
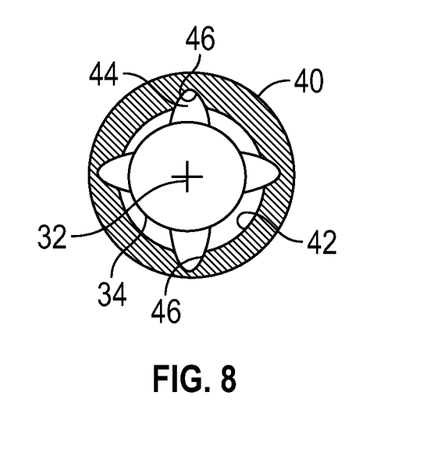
FIG. 8 is a cross-sectional view of a first bevel gear installed onto a shaft of the adjustment mechanism.

Referring again to FIGS. 4 and 5, a first bevel gear 40 is supported in the bezel 16 by the shaft support 36. The first bevel gear 40 is hollow and is slidably mounted on the adjustment shaft 34. As shown in FIG. 8, shaft engagement features 44 of the adjustment shaft 34 engage with complimentary gear engagement features 46 of the interior 42 of the first bevel gear 40 such that rotation of the adjustment shaft 34 about the knob axis 32 drives rotation of the first bevel gear 40 about the knob axis 32. Referring again to FIGS. 4 and 5, the shaft support 36 allows for rotation of the first bevel gear 40 about the knob axis 32, but prevents the first bevel gear 40 from moving axially along the knob axis 32. In some embodiments, the axial retention of the first bevel gear 40 is achieved by gear shoulders 48 of the first bevel gear 40 abutting support surfaces 50 of the shaft support 36.

The first bevel gear 40 meshes with a second bevel gear 52, such that rotation of the first bevel gear 40 drives rotation of the second bevel gear 52. The second bevel gear 52 is supported by a gear housing 54, and is coaxial and corotational with an intermediate gear 56 at an intermediate axis 58. The intermediate gear 56 meshes with a drive gear 60, such that rotation of the second bevel gear 52 drives rotation of the drive gear 60 about a drive axis 62. Referring to FIG. 5, the drive gear 60 is operably connected to a drive secondary vane 26a of the plurality of secondary vanes 26. As the drive gear 60 rotates about the drive axis 62, the drive secondary vane 26a is directly rotated about its secondary vane axis 28.

The plurality of secondary vanes 26 are disposed in a vent housing 64 and are axially positioned by an upper vane support 66 and a lower vane support 68 in the vent housing 64. In some embodiments, the secondary vanes 26 each have upper locating pins 70 and lower locating pins 72, coaxial with the secondary vane axes 28, which are inserted into upper support openings 74 and lower support openings 76 to retain the secondary vanes 26 in the vent housing 64, while allowing the secondary vanes 26 to rotate about their respective secondary vane axes 28. In some embodiments, the upper locating pins 70 and lower locating pins 72 are positioned on the secondary vane axes 28. To ensure that the secondary vanes 26 rotate about the secondary vane axes 28 together, each secondary vane 26 and 26a includes a linkage pin 78, offset from the vane axes 28. The linkage pins 78 are installed into a linkage arm 80 which interconnects all of the secondary vanes 26. When the drive secondary vane 26a is rotated by the drive gear 60, the linkage arm 80 urges corresponding rotation of the remainder of the secondary vanes 26 about their respective vane axes 28.

Figure 9:
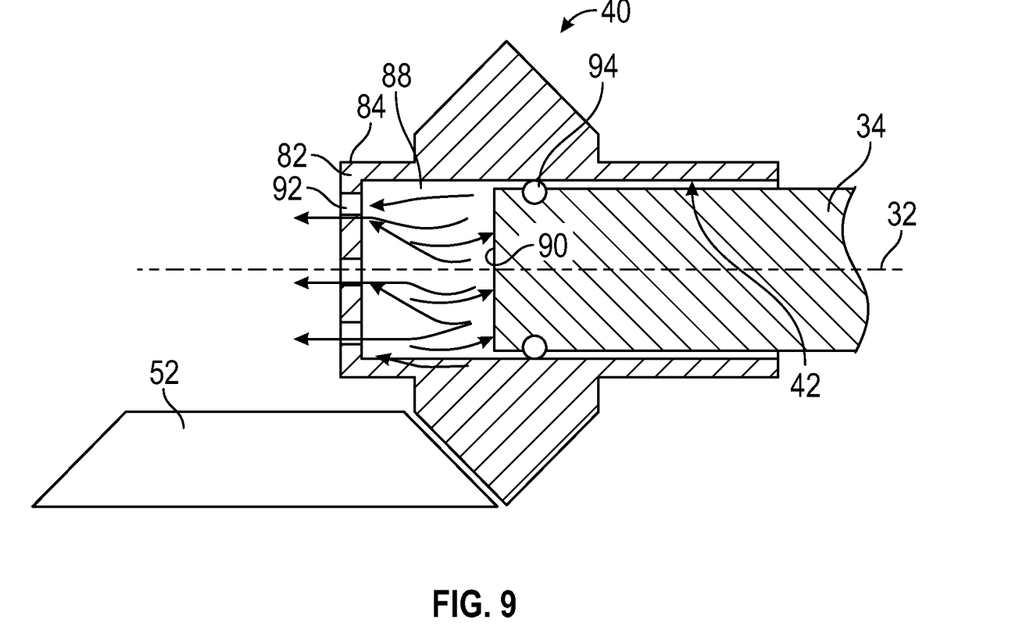
FIG. 9 is another cross-sectional view of the first bevel gear installed onto the shaft of the adjustment mechanism.
Figure 10A:
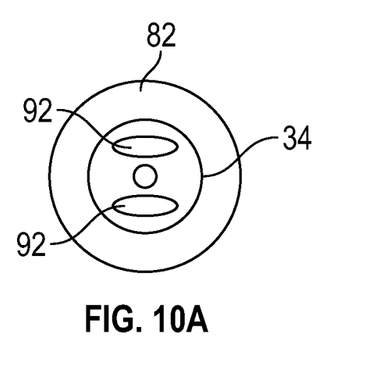
FIG. 10A-10E illustrate embodiments of opening configurations of an end cap of a first bevel gear.
Figure 10B:
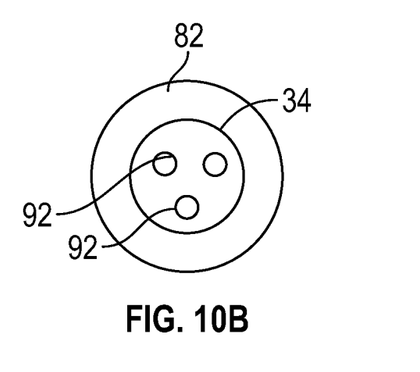
Figure 10C:
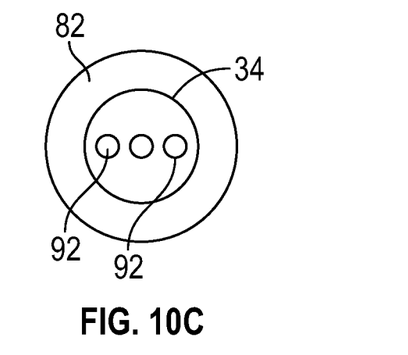
Figure 10D:
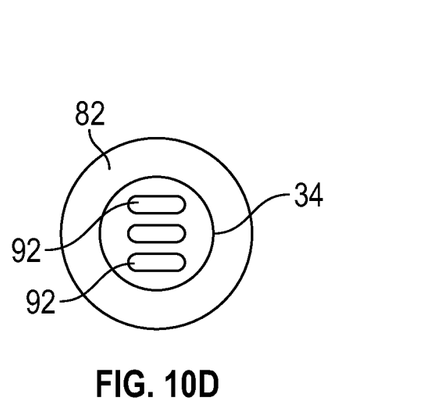
Figure 10E:
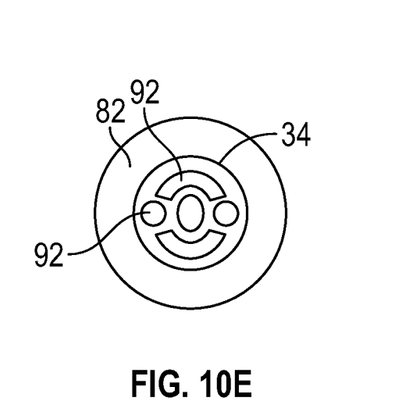

As previously stated, the adjustment shaft 34 is located inside the first bevel gear 40 and slides inside the first bevel gear 40 to adjust a position of the primary vane 22. Referring now to FIG. 9, the first bevel gear 40 includes a gear cap 82 disposed at an end 84. This defines a gear cavity 88 in the interior 42 of the first bevel gear 40 between the gear cap 82 and a shaft end 90 of the adjustment shaft 34. Further, in some embodiments a seal ring 94 is located between the adjustment shaft 34 and the interior 42 of the first bevel gear 40. The gear cap 82 includes one or more damper features to control a push-pull force felt by the user when moving the adjustment shaft 34 along the knob axis 32, due to airflow present in the gear cavity 88. The damper features include one or more openings 92 in the gear cap 82. Examples of configurations of openings 92 in the gear cap 82 are illustrated in FIGS. 10A-10E. One skilled in the art will readily appreciate that the illustrated configurations of openings 92 are merely exemplary, and that the sizes, shapes, and numbers of openings 92 may be varied to result in a selected total cross-sectional opening area of the openings 92 to assure a desired effort or feeling when moving the adjustment shaft 34 along the knob axis 32, by allowing air present in the gear cavity 88 to escape the air cavity 88 via the openings 92.

The adjustment mechanism and vent assembly 14 described herein allows for the use of vertically slim vent assemblies 14, with full adjustability of primary vanes 22 and secondary vanes 26 through the use of a single adjustment knob 30. Further, the adjustment mechanism reduces complexity of the vent assembly 14 by combining components used for adjustment of the primary vanes 22 and the secondary vanes 26.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:
1. A vent assembly of a vehicle comprising:
a bezel defining a vent opening through which an airflow is directed;
a primary vane extending across the vent opening, the primary vane selectably movable about a primary vane axis to adjust a direction of the airflow in a first direction;
a plurality of secondary vanes arrayed across the vent opening, each secondary vane selectably movable about a secondary vane axis nonparallel to the primary vane axis to adjust the direction of the airflow in a second direction; and
an adjustment knob having a knob central axis, the adjustment knob configured such that movement of the adjustment knob along the knob central axis moves the primary vane about the primary vane axis, and rotating the adjustment knob about the knob central axis moves the plurality of secondary vanes about their respective secondary vane axes;
an adjustment shaft extending from the adjustment knob along the knob central axis;
two parallel disks located along the adjustment shaft spaced apart defining a disk gap therebetween; and
a vane pin extending from the primary vane and disposed in the disk gap;
wherein movement of the adjustment knob along the knob central axis moves the two parallel disks along the central axis, thereby moving the vane pin about the primary vane axis and the primary vane about the primary vane axis.

2. The vent assembly of claim 1, wherein the vane pin is offset from the primary vane axis.

3. The vent assembly of claim 1, further comprising a first bevel gear installed onto the adjustment shaft, the first bevel gear operably connected to the plurality of secondary vanes to move the plurality of secondary vanes about their respective secondary vane axes via rotation of the first bevel gear about the knob axis.

4. The vent assembly of claim 3, wherein the first bevel gear is slidably installed onto the adjustment shaft, such that when the adjustment knob is moved along the knob axis the first bevel gear maintains operable connection with the plurality of secondary vanes.

5. The vent assembly of claim 3, further comprising one or more shaft engagement features of the adjustment shaft engaged with one or more complimentary gear engagement features of the first bevel gear.

6. The vent assembly of claim 3, further comprising a gear cap disposed at an end of the first bevel gear, the gear cap including a plurality of openings to control a force required to move the adjustment knob along the knob axis.

7. The vent assembly of claim 3, wherein the first bevel gear is operably connected to the plurality of secondary vanes via a second bevel gear meshed with the first bevel gear.

8. The vent assembly of claim 1, wherein the primary vane axis is perpendicular to the secondary vane axis.

9. The vent assembly of claim 1, wherein the adjustment shaft extends through the bezel.

10. A method of adjusting airflow through a vent assembly of a vehicle, comprising:
providing an adjustment knob operably connected to a primary vane of the vent assembly and to a plurality of secondary vanes of the vent assembly;
moving the adjustment knob along a central knob axis to rotate the primary vane about a primary vane axis to adjust a position of the primary vane;
rotating the adjustment knob about the central knob axis to rotate the plurality of secondary vanes about their respective secondary vane axes to adjust a position of the plurality of secondary vanes; and adjusting a direction of the airflow as a result of adjusting the position of the primary vane and the plurality of secondary vanes;

wherein:
an adjustment shaft extends from the adjustment knob along the knob central axis;
two parallel disks are located along the adjustment shaft spaced apart defining a disk gap therebetween; and
a vane pin extends from the primary vane and disposed in the disk gap;

the method further including moving the adjustment knob along the knob central axis to move the two parallel disks along the central axis, thereby moving the vane pin about the primary vane axis and the primary vane about the primary vane axis.

11. The method of claim 10, wherein the vane pin is offset from the primary vane axis.

12. The method of claim 10, further comprising moving the plurality of secondary vanes about their respective secondary vane axes via rotation of a first bevel gear about the knob axis, the first bevel gear installed onto the adjustment shaft, the first bevel gear operably connected to the plurality of secondary vanes.

13. The method of claim 12, wherein the first bevel gear is slidably installed onto the adjustment shaft, such when the adjustment knob is moved along the knob axis the first bevel gear maintains operable connection with the plurality of secondary vanes.

14. The method of claim 12, further comprising controlling a force required to move the adjustment knob along the knob axis via a plurality of openings in a gear cap disposed at an end of the first bevel gear.

15. The method of claim 12, wherein the first bevel gear is operably connected to the plurality of secondary vanes via a second bevel gear meshed with the first bevel gear.

16. The method of claim 10, wherein the primary vane axis is perpendicular to the secondary vane axis.

17. The method of claim 10, wherein the adjustment shaft extends through a bezel of the vent assembly.

* * * * *